US010284889B1

(12) United States Patent
Jimenez et al.

(10) Patent No.: US 10,284,889 B1
(45) Date of Patent: May 7, 2019

(54) DETERMINING AN ACTUAL START OF PROGRAM CONTENT RELATIVE TO A SCHEDULED START OF THE PROGRAM CONTENT

(71) Applicant: Verizon Patent and Licensing Inc., Arlington, VA (US)

(72) Inventors: Eduardo Jimenez, Santa Clara, CA (US); Ilyssa Widen, Sunnyvale, CA (US); Rodrigo Meneses, Santa Clara, CA (US); Mahesh Kumar Vasanthusomashekar, Newark, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/885,399

(22) Filed: Jan. 31, 2018

(51) Int. Cl.
| | |
|---|---|
| *H04N 21/235* | (2011.01) |
| *H04N 21/262* | (2011.01) |
| *H04N 21/845* | (2011.01) |
| *H04N 21/2187* | (2011.01) |
| *H04N 21/2387* | (2011.01) |

(52) U.S. Cl.
CPC ....... *H04N 21/262* (2013.01); *H04N 21/2187* (2013.01); *H04N 21/235* (2013.01); *H04N 21/2387* (2013.01); *H04N 21/8456* (2013.01)

(58) Field of Classification Search
CPC ............. H04N 21/262; H04N 21/2187; H04N 21/235; H04N 21/2387; H04N 21/8456
USPC ........................................ 725/116
See application file for complete search history.

(56) References Cited

U.S. PATENT DOCUMENTS

| | | | |
|---|---|---|---|
| 6,771,885 B1 * | 8/2004 | Agnihotri ............. | H04N 5/782 386/314 |
| 2003/0028877 A1 * | 2/2003 | Everett ................ | G11B 27/034 725/39 |
| 2011/0211812 A1 * | 9/2011 | Tzoukermann .... | H04N 7/17318 386/250 |
| 2012/0099795 A1 * | 4/2012 | Jojic .................... | G06K 9/3266 382/199 |

* cited by examiner

*Primary Examiner* — Alfonso Castro

(57) ABSTRACT

An example may include identifying broadcast content, where the broadcast content includes program content of a program; identifying a scheduled start time of a time slot associated with the broadcast content; determining whether the broadcast content includes overflow content based on whether the broadcast content includes at least one of end credits or a break; and when the broadcast content does include the overflow content: determining an end time of the overflow content of the broadcast content; determining an actual start time of the program content based on the end time of the overflow content; and performing an action to enable a media client to play back the broadcast content, where the action enables the media client to begin play back at the actual start time of the program content.

20 Claims, 5 Drawing Sheets

US 10,284,889 B1

DETERMINING AN ACTUAL START OF PROGRAM CONTENT RELATIVE TO A SCHEDULED START OF THE PROGRAM CONTENT

BACKGROUND

Streaming media (e.g., video streaming) involves delivering content and continually presenting the content to an end-user. A media stream can include a live stream, a look-up stream, and/or the like. In a live stream, content is provided to a destination device without saving the content (e.g., using memory resources). In a look-up stream, content can be saved and/or buffered (e.g., temporarily stored) in a look-up storage prior to being provided to a destination device.

DETAILED DESCRIPTION OF PREFERRED EMBODIMENTS

Figure 1:
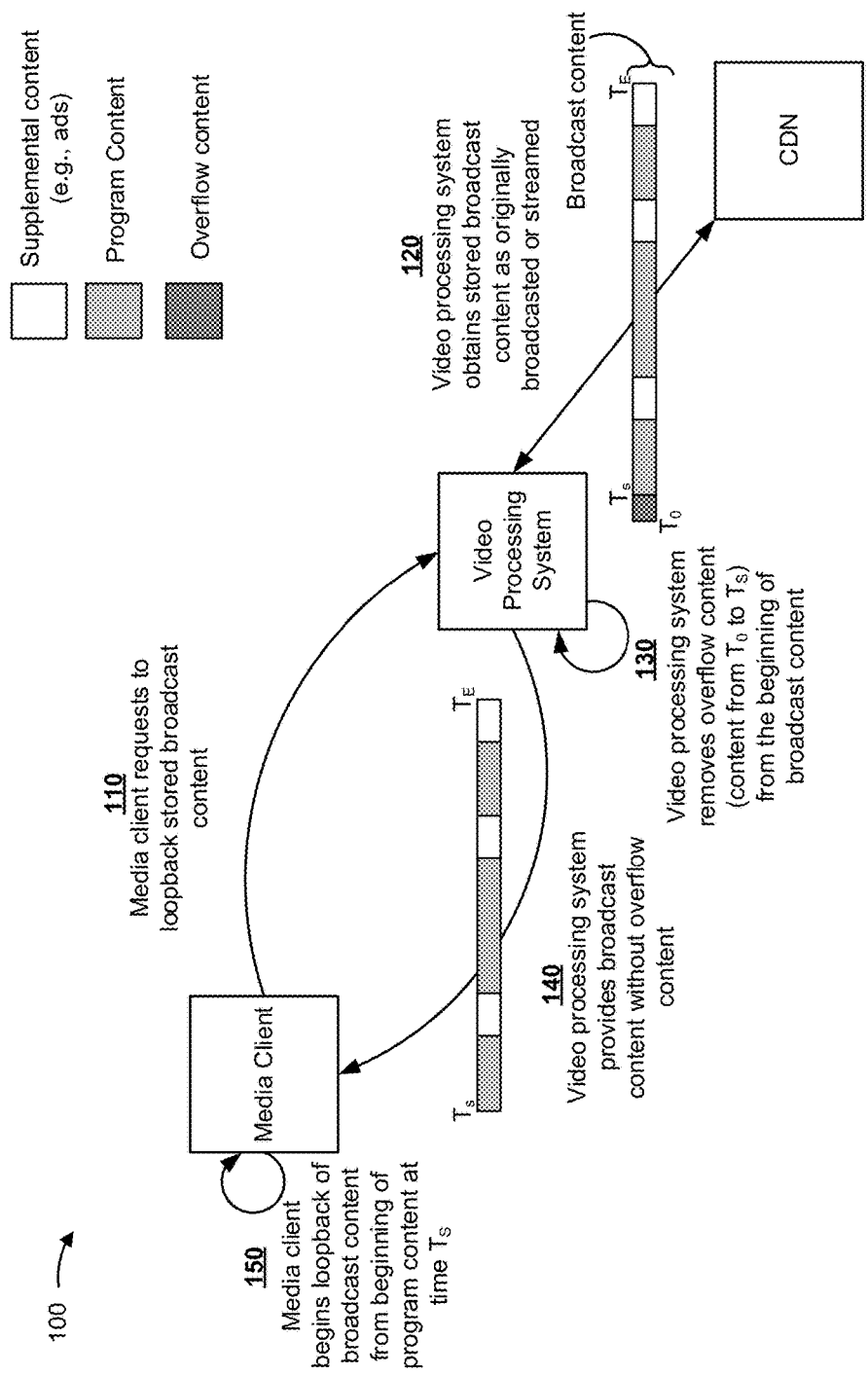
FIG. 1 is a diagram of an overview of an example implementation described herein.

The following detailed description of example implementations refers to the accompanying drawings. The same reference numbers in different drawings can identify the same or similar elements.

In many instances, broadcasted content can be stored so that it can be replayed at a later time. For example, a content delivery network (CDN) can store broadcast content (e.g., content that was broadcasted over radio, television, or a media stream) that can be accessed by a media client during playback (e.g., from a data store). The broadcast content can be stored in sections according to a broadcast schedule of programs. For example, if a program was scheduled to be broadcasted on a channel (or via a stream) between 12:00 pm and 1:00 pm, the section of stored broadcast content for that program can include all content that was broadcasted on that channel (or by that network) between 12:00 pm and 1:00 pm.

However, in many instances, program content for a program may not be broadcasted from a beginning of the program content at the scheduled start of the broadcast schedule. For example, in some cases, overflow content, such as advertising content of a break of the original broadcast or end credits from a previous program, can be broadcast at the scheduled start. As such, the actual start of the program (i.e., when a media client begins to play back (e.g., stream or broadcast) actual program content of the stored broadcast content) can be delayed relative to the scheduled time. The delayed start of the program content can cause confusion to a user, as the program might not begin as expected by the user (from the start of the program) for a somewhat extended period of time (e.g., 15 seconds, 30 seconds, or more). In such instances, the user can make one or more additional attempts to access the stored broadcast content because the user can believe that the previously obtained broadcast content was erroneously obtained, when in fact the original broadcast content was the correct broadcast content, but the original broadcast content did not begin with the program content.

Some implementations, described herein, identify an actual time of program content within stored broadcast content. As such, during playback of the broadcast content, the replay of the broadcast content can begin at the actual start of the program (with the broadcast or stream of program content), rather than starting with overflow content. In some implementations, described herein, a video processing service can identify break information associated with a break and/or can identify end credits within a section of broadcast content at or near the scheduled beginning of the program, and determine an end point of the break or end credits to determine the actual time of the program of the broadcast content. As such, a media client that begins playing back broadcast content from an actual start of a program can lessen an amount of content that is to be streamed as overflow content can be skipped and/or removed from the broadcast content, thus saving networking and/or computing resources, while still providing the expected user experience. Furthermore, user confusion can be avoided, which can avoid unnecessary uses of additional network resources or computing resources to re-request and/or re-access correctly accessed broadcast content.

FIG. 1 is a diagram of an overview of an example implementation 100 described herein. The example implementation 100 includes a media client, a video processing system, and a CDN. As shown in FIG. 1, the video processing system enables the media client to play back broadcast content, stored by the CDN, from a start of program content within the broadcast content.

As shown in FIG. 1, and by reference number 110, the media client requests to play back stored broadcast content. As shown, the media client requests the video processing system to play back stored broadcast content. Additionally, or alternatively, the media client can send a request to the CDN to access (e.g., download and/or stream) the broadcast content. As shown by reference number 120, the video processing system obtains the stored broadcast content as it was originally broadcasted or streamed. As shown, the broadcast content includes overflow content, program content, and supplemental content (which can include advertisements, which can be referred to herein as "ads"). The broadcast content of example implementation 100 shows that the broadcast content goes from time $T_0$ to time $T_E$ and program content in the broadcast content begins at time $T_S$. As shown, the overflow content is a section of the broadcast content that begins at time $T_0$ and ends at the start of the program content at time $T_S$.

As further shown in FIG. 1, and by reference number 130, the video processing system removes the overflow content from the beginning of the broadcast content. For example, the video processing system can identify a characteristic of the broadcast content that indicates whether the start of the broadcast content (e.g., at time $T_0$) includes program content. More specifically, the video processing system can determine whether the broadcast content at or near time $T_0$ includes a break of the broadcast content (e.g., a break that includes supplemental content, such as ads) and/or end credits (or content that includes end credits). In such cases, when a break or end credits are identified at or near time $T_0$, the video processing system can determine that the broadcast content includes overflow content. As such, the video processing system can determine the end of the overflow content (e.g., based on identifying the end of the break and/or the end of the end credits) to determine the start of the program content and remove the overflow content.

As further shown in FIG. 1, and by reference number 140, the video processing system provides the broadcast content without the overflow content (e.g., so that the media client can begin streaming the broadcast content from the start time (shown as time $T_S$) of the program content). In some implementations, the video processing system can identify the start time of the program content of the broadcast content and provide the start time to the media client to enable the media client to begin streaming the broadcast content from the start time of the program content. As shown by reference number 150 in example implementation 100, the media client begins the playback of the broadcast content from the beginning of the program content at time $T_S$. Accordingly, the media client, when playing back the broadcast content of a program, can start the broadcast content from the start of the program content. As such, beginning the broadcast content with other content (such as overflow content) can be avoided, thus preventing unnecessary downloading or streaming of a portion of the broadcast content while maintaining an expected user experience. Furthermore, beginning playback from the start of the program content can avoid user confusion and/or unnecessary downloading or streaming of the broadcast content (e.g., when the user does not actually view the obtained broadcast content due to confusion of the broadcast content beginning with the overflow content) or unnecessary re-requests of the broadcast content (e.g., when a user attempts to re-download or re-stream the broadcast content believing a previous download or stream was erroneous).

As indicated above, FIG. 1 is provided merely as an example. Other examples are possible and can differ from what was described with regard to FIG. 1.

Figure 2:
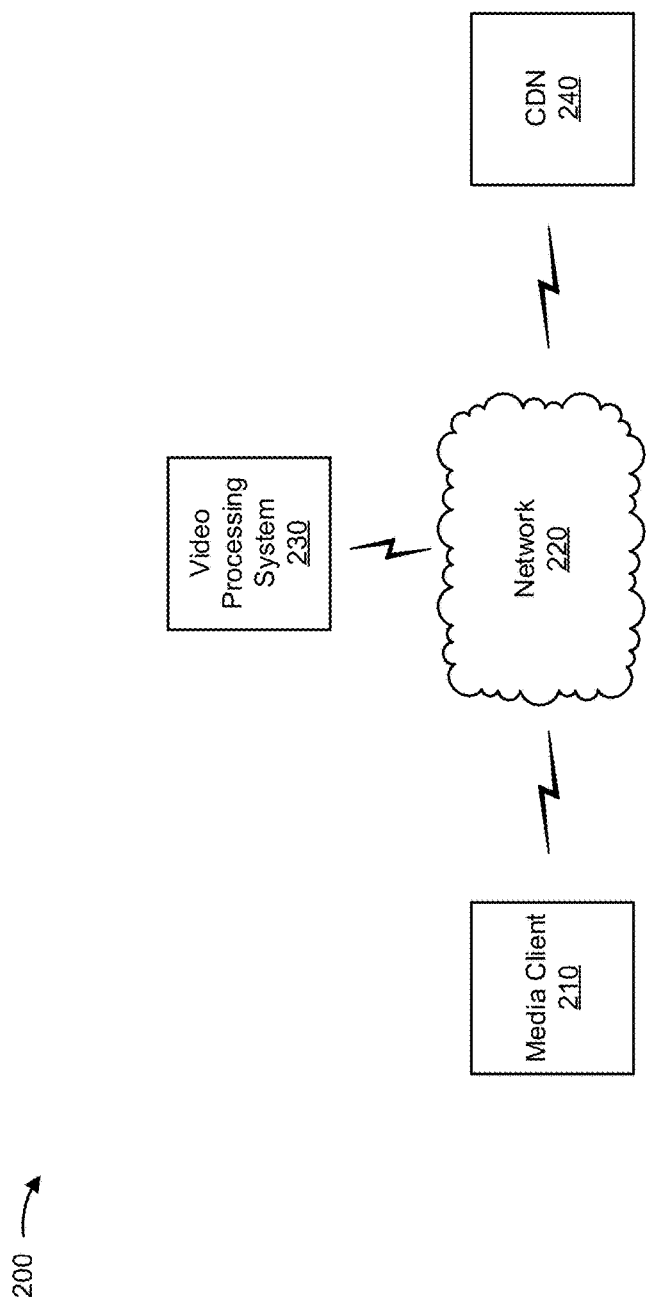
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a media client 210, a network 220, a video processing system 230, and content delivery network (CDN) 240. Devices of environment 200 can interconnect via wired connections, wireless connections, or a combination of wired and wireless connections.

Media client 210 includes a device capable of receiving, transmitting, and/or processing multimedia content (e.g., broadcast content, program content, supplemental content, and/or the like) and providing the multimedia content to a user (e.g., via a display device). Examples of media client 210 can include a smartphone, a set-top box, a casting stick (e.g., a high-definition media interface (HDMI) dongle), a computer, a tablet, a cable card, a gaming device, a portable electronic device, and/or other types of devices capable of receiving, transmitting, and/or processing multimedia content and providing the multimedia content to a user. According to some implementations, described herein, media client 210 can access broadcast content that has been processed by video processing system 230 so that broadcast content, when accessed (e.g., downloaded, streamed, and/or the like) by media client 210, begins with program content rather than the overflow content.

Network 220 includes one or more wired and/or wireless networks. For example, network 220 can include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Video processing system 230 includes one or more devices capable of storing, processing, and/or routing information associated with supplemental content. In some implementations, video processing system 230 can include a communication interface that allows video processing system 230 to receive information from and/or transmit information to other devices in environment 200. For example, video processing system 230 can receive requests via network 220 for broadcast content and/or identify requests for broadcast content to CDN 240. According to some implementations, based on the requests for broadcast content, video processing system 230 can process the broadcast content (e.g., to remove overflow content from the broadcast content, to include an actual start time indicator, and/or the like) so that the broadcast content, when played back by media client 210, begins with the start of the program content.

CDN 240 includes one or more server devices (e.g., content servers) or one or more groups of server devices within one or more wired and/or wireless networks. For example, CDN 240 can include a content delivery network, a cellular network (e.g., a long-term evolution (LTE) network, a code division multiple access (CDMA) network, a 3G network, a 4G network, a 5G network, another type of cellular network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks. In some implementations, CDN 240 can provide broadcast content of one or more broadcasts and/or one or more media streams to media client 210 and/or video processing system 230.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
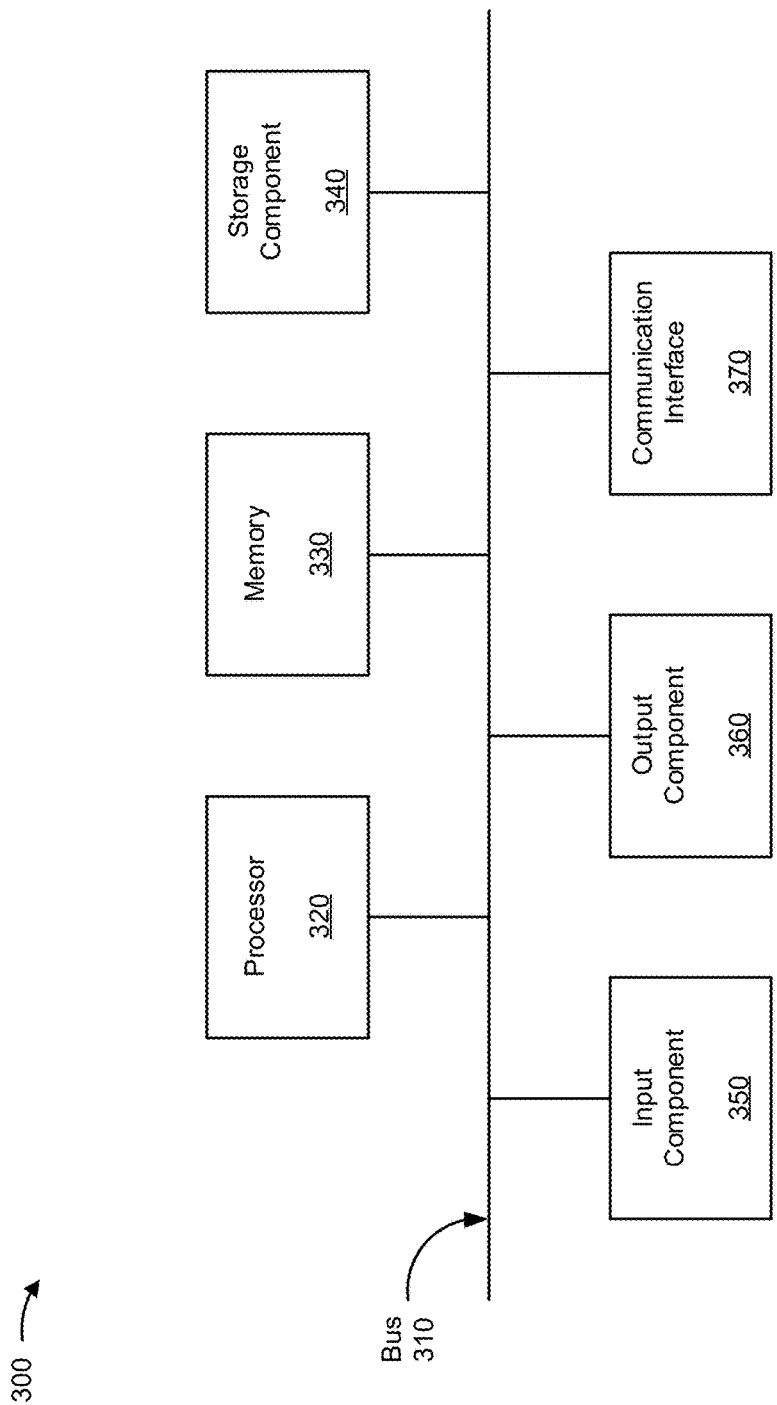
FIG. 3 is a diagram of example components of one or more devices of FIG. 2.

FIG. 3 is a diagram of example components of a device 300. Device 300 can correspond media client 210, video processing system 230, and/or CDN 240. In some implementations, media client 210, video processing system 230, and/or CDN 240 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
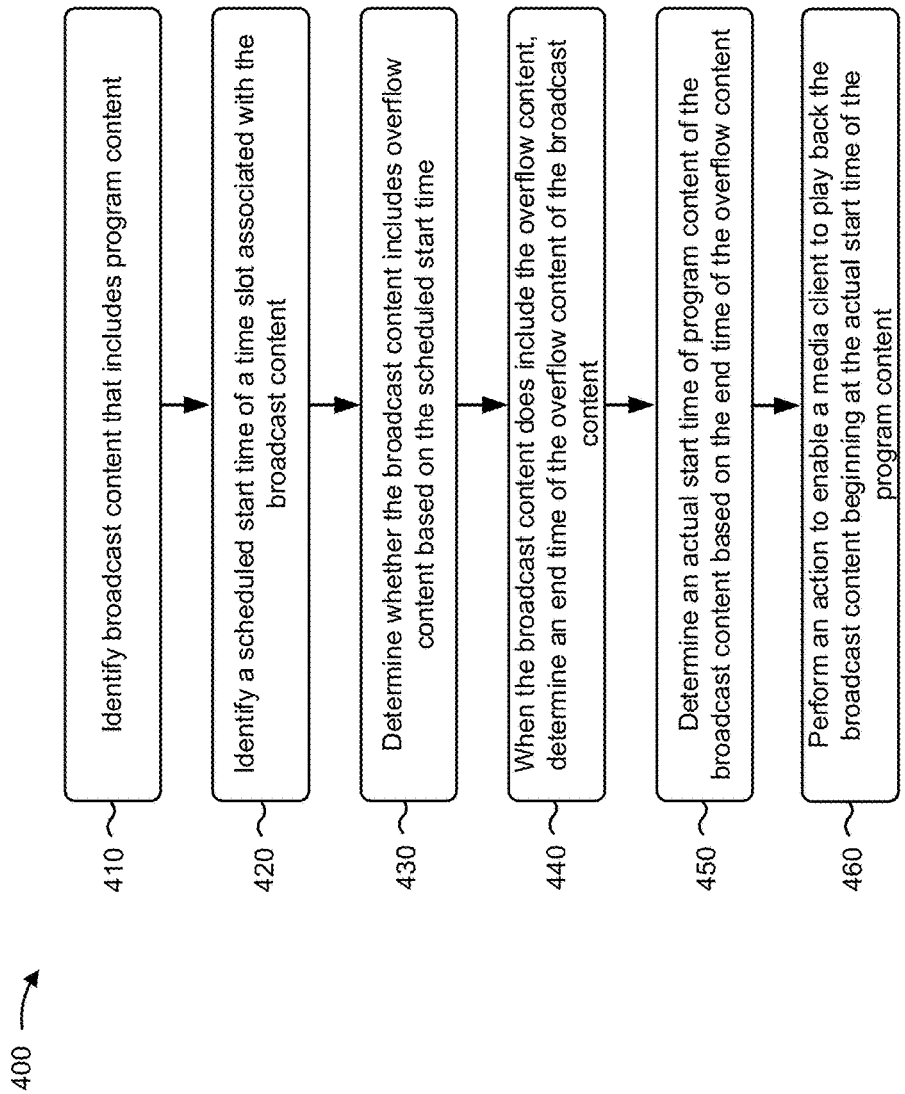
FIG. 4 is a flow chart of an example process for determining an actual start of program content relative.

FIG. 4 is a flow chart of an example process 400 for determining an actual start of program content relative. In some implementations, one or more process blocks of FIG. 4 can be performed by video processing system 230. In some implementations, one or more process blocks of FIG. 4 can be performed by another device or a group of devices separate from or including video processing system 230, such as media client 210 and/or CDN 240.

As shown in FIG. 4, process 400 can include identifying broadcast content that includes program content (block 410). For example, video processing system 230 (e.g., processor 320 of video processing system 230) can identify the broadcast content in or via CDN 240. In some implementations, video processing system 230 can identify the broadcast content based on receiving a request for the broadcast content from media client 210, based on detecting a request from media client 210 to CDN 240 for broadcast client, based on detecting broadcast content being added to CDN 240, based on a program or program time slot associated with the broadcast time slot ending, and/or the like.

As used herein, content can be broadcast content, program content, supplemental content, or overflow content. Broadcast content can include content that was broadcasted over radio, television, or a media stream during a particular time period. In some implementations, the broadcast content can be stored (e.g., by CDN 240) as it is broadcasted (e.g., over radio or television) or as it is streamed (e.g., via a media stream) from a media outlet, such as a media production facility, a media production company, a media network, a content creator, a content service provider, and/or the like. The broadcast content can be a stored set of data that includes content that can be replayed (e.g. looped back, played back, and/or the like) by media client 210.

In some implementations, content can include live content (e.g., live video, provided in real-time or near real-time), look-up content (e.g., catch-up content, stored content, and/or the like), on demand content, and/or the like. In some implementations, the content can include one or more packets. In some implementations, the content can include one or more packets. In some implementations, a packet (e.g., of the one or more packets) can refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via video processing system 230, CDN 240, and/or network 220. In some implementations, at least a portion of the content can include a segment, a chunk, and/or the like.

As used herein, program content can include content produced by a media company, a media network, a media broadcast company, a content creator, a content service provider, and/or the like. For example, program content can include video, audio, text, an image, and/or the like for a television program, a movie, a televised sporting event, a newscast, a podcast, a niche streaming, a hosted or shared video/audio file, an event cinema, a livecast, a video game, and/or the like.

Supplemental content can include metadata (e.g., metadata (e.g., signatures, fingerprints, and/or the like) associated with program content of the media stream), display content associated with the media stream, advertising content (or ad content), and/or the like. As such, supplemental content can be produced or associated with an advertisement agency, media company, media network, media broadcast company, and/or the like for the purpose of advertising a brand, a product, program content, and/or the like. For example, supplemental content can include video, audio, text, an image, and/or the like for a commercial, a preview, a banner advertisement, a public service announcement, an endorsement, an advertorial, and/or the like.

Overflow content can include program content and/or supplemental content that is included within a time slot that is allocated for a program that is not associated with the program content or the supplemental content. As used herein, overflow content is content that extends from broadcast content associated with a previous time slot into broadcast content that is associated with a current time slot (or a time slot of interest). As such, overflow content can be a section of broadcast content that is between a start time of the broadcast content and a start time of program content of the broadcast content.

In some implementations, video processing system 230 can identify the broadcast content based on identification information associated with the broadcast content. For example, video processing system 230 can identify the identification information associated with the broadcast content within a request for the broadcast content (e.g., from media client 210) and/or by analyzing a data structure (e.g., a data store of CDN 240) that includes the broadcast content. Accordingly, when video processing system 230 detects a request for broadcast content from media client 210, video processing system 230 can identify the broadcast content (e.g., within a data store of CDN 240) based on the identification information.

In some implementations, video processing system 230 can identify the broadcast content based on a time that the broadcast content was created and/or stored in a data store of CDN 240. For example, video processing system 230 can scan a data store of CDN 240 to identify newly added broadcast content (e.g., content that was added within the 5 minutes, 15 minutes, hour, 2 hours, 12 hours, day, and/or the like). Accordingly, video processing system 230 can identify new broadcast content that is to be processed according to some implementations described herein.

In this way, video processing system 230 can identify broadcast content to permit video processing system 230 to identify a scheduled start time of the broadcast content.

As further shown in FIG. 4, process 400 can include identifying a scheduled start time of a time slot associated with the broadcast content (block 420). For example, video processing system 230 (e.g., processor 320 of video processing system 230) can identify the scheduled start time of the time slot of the broadcast content. In some implementations, video processing system 230 can identify the scheduled start time of the time slot based on identifying the broadcast content.

A scheduled start time of a time slot of the broadcast content can be a time at which a program of the broadcast content was scheduled to start. The program of the broadcast content can be scheduled to be streamed according to a schedule of a service provider and/or according to a schedule for allocating broadcast spectrum or allocating a media stream for streaming the program. As such, the scheduled start time of the time slot can correspond to a time period during which the program was scheduled to be broadcast.

According to some implementations, broadcast content can be generated and/or stored (e.g., in a data store of CDN 240) according to a scheduled start time and/or a scheduled time slot during which the broadcast content was broadcasted or streamed. For example, the broadcast content can be all data (e.g., video data, audio data, text data, image data, and/or the like) that was broadcasted via a channel of the broadcast content and/or streamed via a media stream of the broadcast content during the time slot. As such, a time slot associated with the broadcast content can be a time period during which the broadcast content was broadcasted or streamed. For example, if the broadcast content was broadcasted or streamed between 12:00 pm and 1:00 pm, the time slot associated with the broadcast content would be 12:00 pm to 1:00 pm. Correspondingly, in that example, the start time of the time slot of the broadcast content is 12:00 pm. As such, the broadcast content can be defined by the time slot and/or the start time that a program of the broadcast content was scheduled to start and/or end.

According to some implementations, video processing system 230 can identify the scheduled start time of the time slot by analyzing timing information associated with the broadcast content. Such timing information can be stored and/or included within broadcast content information associated with the broadcast content. The example broadcast content information can be stored with or can be stored in conjunction with the broadcast content. Accordingly, upon identifying the broadcast content, video processing system 230 can identify the timing information, and thus, the scheduled start time of the time slot of the broadcast content.

In some implementations, media client 210 can request to play back broadcast content by sending a request to video processing system 230 and/or CDN 240 that includes the scheduled start time and/or broadcast identifier (e.g., a broadcast channel, a broadcast network, a program identifier, and/or the like). As such, based on such a request, video processing system 230 can identify the scheduled start time in the request and obtain the broadcast content from timestamped broadcast content identified by the broadcast identifier in the CDN 240. For example, media client 210 can request to play back a program that was previously broadcast on Channel 7 at 12:00 pm. As such, media client 210 can send a request to video processing system 230 that identifies the start time and the channel number of the program. As such, in some implementations, video processing system 230 can obtain or identify the broadcast content from timestamped broadcast content that was broadcasted on Channel 7 at start time 12:00 pm, from CDN 240. In some implementations, video processing system 230 can refer to a program schedule associated with Channel 7 to determine when the broadcast content that was scheduled to start at 12:00 pm ended. For example, if the program was scheduled to start at 12:00 pm and end at 1:00 pm, video processing system 230 can obtain all broadcasted content that was broadcasted on channel 7 between 12:00 pm and 1:00 pm. Accordingly, the video processing system 230 can identify the scheduled start time of a time slot of the broadcast content (e.g., to obtain the broadcast content).

In this way, video processing system 230 can identify a scheduled start time of a time slot of the broadcast content to permit video processing system 230 to identify a characteristic of the broadcast content associated with the start time.

As further shown in FIG. 4, process 400 can include determining whether the broadcast content includes overflow content based on the scheduled start time (block 430). For example, video processing system 230 (e.g., processor 320 of video processing system 230) can determine that the broadcast content does or does not include overflow content. In some implementations, video processing system 230 can determine that the broadcast content includes overflow content based on identifying the start time of the time slot of the broadcast content.

According to some implementations, video processing system 230 can determine that the broadcast content includes overflow content based on an analysis of the type content that begins the broadcast content. For example, video processing system 230 can analyze a section of the broadcast content that begins at the scheduled start time of the time slot (or start of the broadcast content) and ends a threshold amount of time later (e.g. 1 minute later, 2 minutes later, 5 minutes later, and/or the like). Video processing system 230 can analyze the broadcast content during the time period using signature analysis (e.g., that can identify signatures of supplemental content (such as ads), that can identify signatures of program content, and/or the like), using image analysis and/or video analysis (e.g., to identify an image or video representative of end credits), and/or using artificial intelligence (AI) (e.g., machine learning, deep learning, and/or the like) in combination with signature analysis, image analysis, and/or video analysis to identify whether the broadcast content begins with program content or overflow content.

In some implementations, video processing system 230 can utilize a model to determine whether a beginning section of the broadcast content (e.g., a first minute of broadcast content, a first 2 minutes of broadcast content, and/or the like) includes end credits. For example, video processing system 230 can perform an image analysis and/or video analysis of the beginning section to identify indicators associated with end credits. Such indicators can include a large portion or percentage of an image or length of video of the beginning section is a particular color (e.g. black), that an image or length of video of the beginning section includes text (e.g., names of individuals or organization listed in the end credits), an image or length of video that indicates that the beginning section includes multiple partitions (e.g., indicating that end credits can be playing in one partition and program content or supplemental content can be playing in another partition), and/or the like. In some implementations, if video processing system 230 determines that an end of the beginning section that is analyzed includes end credits, video processing system 230 can analyze an additional section of the broadcast content after the beginning section of the content until video processing system 230 does not identify any indicators in the broadcast content associated with the end credits. According to some implementations, video processing system 230 can utilize AI to update the image analysis and/or video analysis for particular networks of the broadcast content, channels of the broadcast content, media streams of the broadcast content, and/or the like.

In some implementations, video processing system 230 can obtain break information associated with a broadcast or stream of the broadcast content. For example, video processing system 230 can refer to a supplemental content server in communication with network 220 to determine whether the supplemental content server provided supplemental content during or near the scheduled start of the time slot of the broadcast content. In such cases, if the supplemental content server did provide supplemental content during or near the scheduled start time of the time slot, video processing system 230 can obtain break information associated with the supplemental content. The break information can include timing information (e.g., a start time, an end time, a length of time, and/or the like) associated with when the supplemental content of the break began and when the supplemental content of the break ended. As such, if the end time was later than the scheduled start time of the time slot of the broadcast content, video processing system 230 can determine that overflow content is present in the broadcast content between the scheduled start time and the end time of the supplemental content of the break. In such cases, the overflow content can include supplemental content (e.g., all or part of one or more advertisements).

In some implementations, video processing system 230 can determine whether the broadcast content includes overflow content based on broadcast content information associated with the broadcast content. For example, video processing system 230 can identify a particular network, a particular channel, a particular time slot, and/or program of the broadcast content from the broadcast content information. Based on the broadcast content information, the video processing system 230 can determine that the broadcast content likely begins with overflow content or begins with program content. For example, a first network can frequently begin program content according to the scheduled start time while a second network can frequently delay beginning the program content relative to the scheduled start time. Accordingly, the video processing system 230, for the first network, can presume that the broadcast content does not include overflow content and not perform an analysis to determine whether the broadcast content includes overflow content. On the other hand, for the second network, video processing system 230 can perform additional analysis (e.g., such as the analysis described above) on a beginning section of the broadcast content to determine whether the broadcast content includes overflow content.

According to some implementations, video processing system 230 can include a data structure (e.g., a database, a data store, a task graph, and/or the like) for maintaining information and/or data associated with particular broadcast channels, broadcast networks, media streams, and/or the like. In some implementations, video processing system 230 can utilize AI to identify and/or learn how or which broadcast channels, broadcast networks, and/or media streams include overflow content. For example, video processing system 230 can utilize the AI to determine which broadcasts or media streams commonly include overflow content based on including supplemental content at the beginning or end of a program slot, based on frequency of end credits extending into a next program time slot, based on type of broadcast content that is broadcasted at particular times (e.g., live events can frequently extend into a next time slot), and/or the like.

In some implementations, when video processing system 230 determines that the broadcast content does not include overflow content, video processing system 230 can use the model to identify end credits to analyze previous sections of broadcast content before the scheduled start time of the time slot of the broadcast content to identify end credits of the previous program. Accordingly, video processing system 230 can analyze sections of broadcast content (which can be obtained from CDN 240) before the scheduled start time of the time slot until end credits of the previous program are identified. In such cases, it can be possible that program content of the broadcast content started before the scheduled start time of the time slot of the broadcast content. As such, when video processing system 230 identifies the end credits of the previous program in a section of the broadcast content before the scheduled start time, video processing system 230 (and if there is no corresponding break of the broadcast content present) can determine that the program content started before the scheduled start time of the time slot of the broadcast content.

In this way, video processing system 230 can identify a characteristic of the broadcast content to permit video processing system 230 to identify overflow content and/or determine an end time of the overflow content of the broadcast content.

As further shown in FIG. 4, process 400 can include, when the broadcast content includes overflow content, determining an end time of the overflow content of the broadcast content (block 440). For example, video processing system 230 (e.g., processor 320 of video processing system 230) can determine the end time of the overflow content. In some implementations, video processing system 230 can determine the end time of the overflow content based on determining that the broadcast content includes overflow content.

As described herein, overflow content can be a section of the broadcast content that begins content at a scheduled start time of a time slot of the broadcast content and does not include program content associated with the broadcast content. Accordingly, overflow content can be content that causes a delay between a scheduled start for a program and an actual start of program content for the program. In some implementations, overflow content can include program content of a previous program scheduled to be broadcasted before the scheduled start time of the time slot of the broadcast content, end credits of the previous program that extended beyond the scheduled start time of the time slot of the broadcast content and/or supplemental content, such as ad content, that was broadcasted before the beginning of the program content of the program of the broadcast content.

An end time of the overflow content corresponds to when the overflow content of the broadcast content ends. According to some implementations, described herein, the end time of the overflow content can be the same as and/or just before the start time of program content of the broadcast content. Accordingly, to determine the start time of the program content of the broadcast content, video processing system 230 can identify the end time of the overflow content.

As described above, video processing system 230 can utilize a model to identify whether end credits are present in overflow content. Accordingly, when end credits are identified, video processing system 230 can utilize the model to determine when the end credits are no longer included in the broadcast content. As such, video processing system 230 can iteratively perform an image analysis or video analysis of beginning sections of the broadcast content until video processing system 230 determines that end credits are no longer included toward the beginning of the broadcast content. In some implementations, video processing system 230 can identify a first frame of the broadcast content after the overflow content that does not include the end credits and identify a timestamp associated with the first frame. In such cases, video processing system 230 can determine the end time of the overflow content to be the same as the time stamp of that first frame.

As described above, video processing system 230 can refer to break information associated with a break that occurred during or after the scheduled start time of the time slot of the broadcast content. As such, video processing system 230 can identify, from supplemental content information associated with the break, when the break ended. Accordingly, when the overflow content includes supplemental content associated with a break, video processing system 230 can determine the end time of the overflow content to be the end of the supplemental content of the break that is included in the supplemental content information.

In this way, video processing system 230 can determine the end time of overflow content of the broadcast content to permit video processing system 230 to determine an actual start time of program content of the broadcast content.

As further shown in FIG. 4, process 400 can include determining an actual start time of program content of the broadcast content based on the end time of the overflow content (block 450). For example, video processing system 230 (e.g., processor 320 of video processing system 230) can identify a start time of a program of the break content by determining the actual start time of the program content. In some implementations, video processing system 230 can determine the actual start time of the program content based on determining the end content of the overflow content, based on determining that the broadcast content does not include overflow content, and/or the like.

The actual start time of the program content can be a time associated with a first chronological frame of the program content within the broadcast content relative. As such, the actual start of the program content can correspond to an actual start of the program of the broadcast content when the program is played back (e.g., by media client 210).

In some implementations, the actual start of the program content is based on the end time of the overflow content. For example, the actual start of the program content can be the same time as the end time of the overflow content or immediately after the end time of the overflow content (e.g., a length of time corresponding to the frame rate of the broadcast content).

In some implementations, the actual start time of the program content can be before the scheduled start time of the time slot of the broadcast content. For example, when no overflow content is identified within the broadcast content, analysis of one or more sections of previous broadcast content that were broadcasted before the broadcasted content can be analyzed to determine the actual start time of the program content. In such cases, by finding the end time of the previous program (e.g., using the model to identify end credits as described herein) and determining that there is no break within a threshold length of time around the scheduled start time of the time slot of the broadcast content, video processing system 230 can determine that the actual start time of the program content is the same as or immediately after the end credits of the previous program identified in the one or more sections of the previous broadcast content.

According to some implementations, determining the actual start time of the program content can enable video processing system 230 to remove any overflow content in the broadcast content and/or enable media client to begin playback of the overflow content from the actual start time of the program content (and thus begin playback of the program at the actual start time of the program rather than the scheduled start time).

In this way, video processing system 230 can video processing system 230 can determine an actual start time of program content of the broadcast content to permit video processing system 230 to perform an action to enable media client to play back the broadcast content from the beginning of the programming content.

As further shown in FIG. 4, process 400 can include performing an action to enable a media client to play back the broadcast content beginning at the actual start time of the program content (block 460). For example, video processing system 230 (e.g., processor 320 of video processing system 230) can perform an action to enable media client 210 to play back the broadcast content. In some implementations, video processing system 230 can perform the action based on determining the actual start time of the program content.

In some implementations, video processing system 230 can perform an action including removing the overflow content from the broadcast content. For example, based on identifying the overflow content, end time of the overflow content, and/or start time of the program content, video processing system 230 can process the broadcast content to remove the overflow content. For example, video processing system 230 can clear (e.g., erase or delete) frames of the overflow content from the broadcast content. In some implementations, performing the action can include storing the broadcast content without the overflow content. For example, video processing system 230 can provide the broadcast content without the overflow content to CDN 240, which can then overwrite the original broadcast content. In such instances, when media client 210 obtains the broadcast content for playback, after video processing system 230 removed the overflow content from the broadcast content, media client 210 can play back the broadcast content from the actual start of the program of the broadcast content (rather than the scheduled start).

In some implementations, video processing system 230 can perform an action including storing an indicator, within the broadcast content (e.g., between a last frame of the overflow content and a first frame of the program content), that enables media client 210 to identify the actual start time of the program content. Accordingly, when media client 210 obtains the broadcast content for playback, media client 210 can identify the indicator of the broadcast content and play back the broadcast content from the actual start of the program of the broadcast content based on the broadcast content.

In some implementations, video processing system 230 can perform an action including sending a notification that includes the actual start time of the program content of the broadcast content. For example, video processing system 230 can send a notification to media client 210 and/or to CDN 240 indicating the actual start time of the program content of the broadcast content. As such, based on the notification, media client 210 can then play back the broadcast content from the actual start of the program content. Additionally, or alternatively, CDN 240 can insert an indicator (e.g., between a last frame of the overflow content and a first frame of the program content) that would enable media client 210, after obtaining the broadcast content from CDN 240, to play back the content beginning at the actual start time of the program content.

In this way, video processing system 230 can perform an action to permit media client 210 to begin playing back the broadcast content at an actual start time of program content of the broadcast content.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

Figure 5:
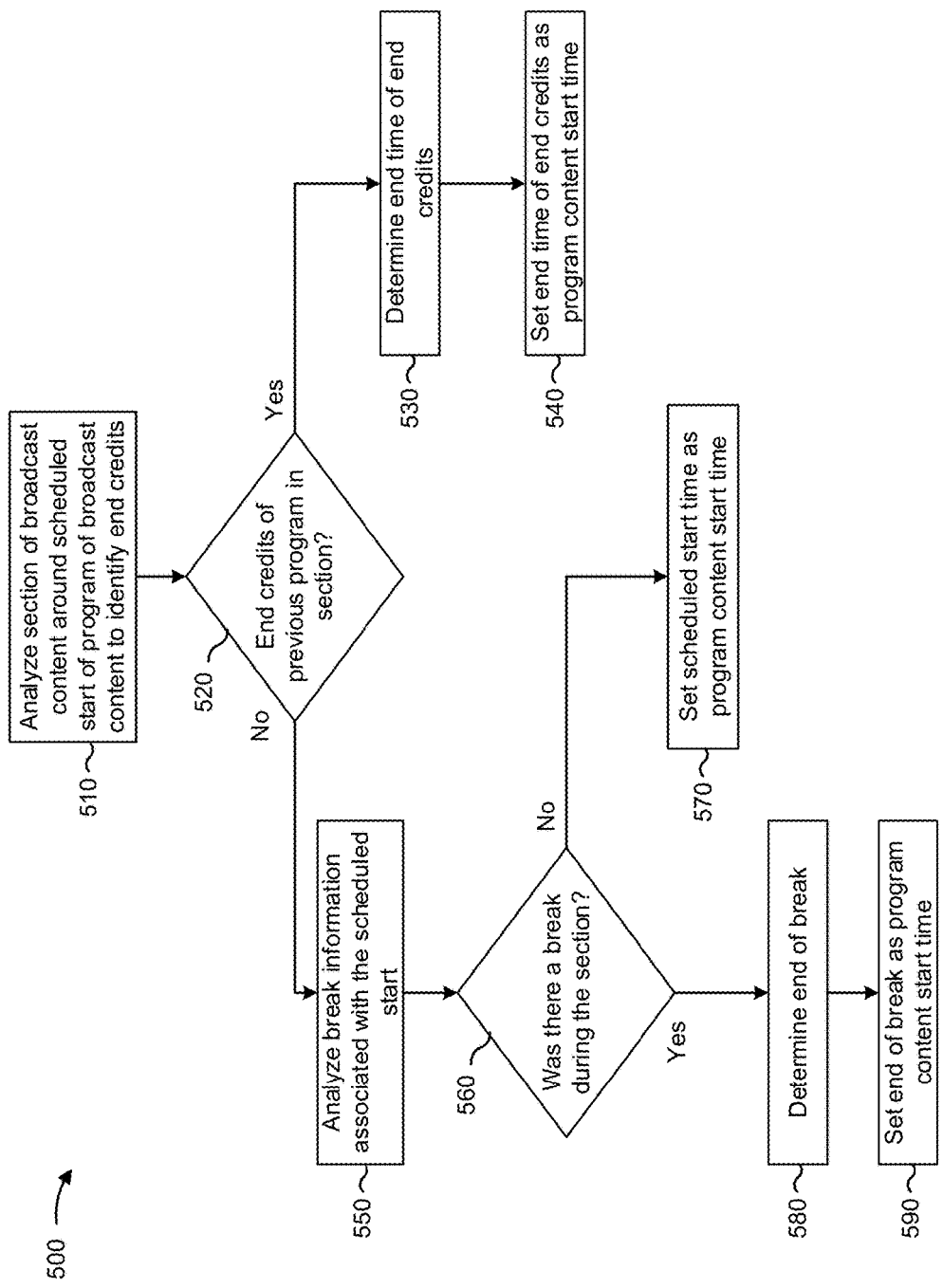
FIG. 5 is a flow diagram of an example implementation relating to the example process shown in FIG. 4.

FIG. 5 is a flow diagram of an example process 500 relating to example process 400. FIG. 5 shows an example of determining an actual start of program content relative to a schedule start of the program content. According to some implementations, example process 500 can be performed to implement one or more blocks of process 400 of FIG. 4. In some implementations, one or more process blocks of FIG. 5 can be performed by video processing system 230. In some implementations, one or more process blocks of FIG. 5 can be performed by another device or a group of devices separate from or including video processing system 230, such as media client 210 and/or CDN 240.

As shown in FIG. 5, at block 510, video processing system 230 analyzes a section of broadcast content around a scheduled start time of a program of the broadcast content to identify end credits. In some implementations, the section of broadcast content can include broadcast content before and/or after the scheduled start. At block 520, video processing system 230 determines whether end credits of a previous program are in the section of broadcast content. If, at block 520, video processing system 230 determines that end credits of the previous program of are included in the section of broadcast content, video processing system 230 determines, at block 530, the end time of the end credits (e.g., using a model to identify end credits). At block 540, video processing system 230 sets the end time of the end credits to be the program content start time.

As further shown by FIG. 5, if, at block 520, video processing system 230 determines that there are no end credits from the previous program in the section of broadcast content, video processing system 230 analyzes, at block 550, break information associated with the scheduled start. For example, video processing system 230 can obtain break information associated with a supplemental content server that provides supplemental content (e.g., ads) for the break. At block 560, video processing system 230 determines whether there was a break during the section. For example, video processing system 230 can determine an overlap in timing of the supplemental content and the section of the broadcast content. If, at block 560, video processing system 230 determines that there was no break during the section of the broadcast content, video processing system 230, at block 570, sets the scheduled start time (e.g., of the program and/or broadcast content) as the program content start time.

As further shown by FIG. 5, if, at block 560, video processing system 230 determines that there was a break during the section, video processing system 230, at block 580, determines an end of the break. For example, video processing system 230 can refer to supplemental content information of supplemental content of the break to determine the end of the break (or, correspondingly, the end of the supplemental content). At block 590, video processing system 230 sets the end of the break as the program content start time.

As indicated above, FIG. 5 is provided merely as an example. Other examples are possible and can differ from what was described with regard to FIG. 5.

Accordingly, as described herein, video processing system 230 can identify an actual start time of program content (or a program) of broadcast content. For example, video processing system 230 can analyze a section of broadcast content (e.g., a section around a scheduled start time of the program of the broadcast content) to identify whether the broadcast content includes overflow content. Based on an end time of the overflow content (e.g., when end credits end or when a break near the scheduled start time ends), video processing system 230 can determine the start point of the program content of the broadcast content (as being the same as the end time of the overflow content or right after the end time of the overflow content). As such, media client 210 can access broadcast content begin playback of the program content at the beginning of the program content (rather than the beginning of the broadcast content). As such, this can lessen an amount of content that is to be streamed by media client 210, thus saving networking and/or computing resources, while still providing an expected user experience.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, or the like.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
    one or more memories; and
    one or more processors, communicatively coupled to the one or more memories, to:
        identify broadcast content,
            where the broadcast content includes program content of a program;
        identify broadcast content information associated with the broadcast content,
            the broadcast content information including at least one of:
                data identifying a particular broadcast network associated with the broadcast content,
                data identifying a particular broadcast channel associated with the broadcast content, or
                data identifying a program type associated with the broadcast content;
        determine, based on the broadcast content information, to perform additional analysis of the broadcast content,
            the determination to perform the additional analysis of the broadcast content being based on a measure of frequency with which overflow content occurs in broadcasts associated with the broadcast content information;
        identify a scheduled start time of a time slot associated with the broadcast content;
        determine, based on the determination to perform additional analysis of the broadcast content, whether the broadcast content includes overflow content based on whether the broadcast content includes at least one of end credits or a break within a time period that includes the scheduled start time,
            where the overflow content comprises a section of the broadcast content that begins at the scheduled start time of the time slot of the broadcast content; and
        when the broadcast content does include the overflow content:
            determine an end time of the overflow content of the broadcast content;
            determine an actual start time of the program content based on the end time of the overflow content; and
            perform an action to enable a media client to play back the broadcast content,
                where the action enables the media client to begin play back at the actual start time of the program content.

2. The device of claim 1, where the one or more processors are further to:
    when the broadcast content does not include the overflow content,
        determine the actual start time of the program content to be the scheduled start time of the time slot, or
        determine the actual start time of the program content to be before the scheduled start time of the time slot.

3. The device of claim 1, where the one or more processors, when determining whether the broadcast content includes overflow content, are to:
    analyze the section of the broadcast content to detect the end credits; and
    determine that the broadcast content includes overflow content when the section includes end credits, or
    determine that the broadcast content does not include overflow content when the section does not include end credits.

4. The device of claim 1, where the one or more processors, when determining whether the broadcast content includes overflow content, are to:

determine that the break occurred during the time period that includes the scheduled start time, where the break is associated with the broadcast content; and
determine that the broadcast content includes overflow content when the scheduled start time occurred during the break, or
determine that the broadcast content does not include overflow content when the scheduled start time did not occur during the break.

5. The device of claim 1, where the one or more processors, when determining the end time of the overflow content, are to:
determine when the end credits of the overflow content ended,
where the end time of the overflow content corresponds to when the end credits ended; or
determine when supplemental content of the break during the time period that includes scheduled start time ended,
the supplemental content being included in the overflow content,
where the end time of the overflow content corresponds to when the supplemental content of the break ended.

6. The device of claim 1, where the one or more processors, when performing the action, are to:
remove the overflow content from the broadcast content to enable the media client to play back the broadcast content without the overflow content.

7. The device of claim 1, where the one or more processors, when performing the action, are to:
provide an indicator that includes information identifying the actual start of the program content,
the indicator being included within the broadcast content to enable the media client to begin play back at the actual start of the program content based on the indicator.

8. A non-transitory computer-readable medium storing instructions, the instructions comprising:
one or more instructions that, when executed by one or more processors, cause the one or more processors to:
identify broadcast content,
where the broadcast content includes program content of a program;
identify broadcast content information associated with the broadcast content,
the broadcast content information including at least one of:
data identifying a particular broadcast network associated with the broadcast content,
data identifying a particular broadcast channel associated with the broadcast content, or
data identifying a program type associated with the broadcast content;
determine, based on the broadcast content information, to perform additional analysis of the broadcast content,
the determination to perform the additional analysis of the broadcast content being based on a measure of frequency with which overflow content occurs in broadcasts associated with the broadcast content information;
identify a scheduled start time of a time slot associated with the broadcast content;
determine, based on the determination to perform additional analysis of the broadcast content, whether the broadcast content includes overflow content based on whether the broadcast content includes at least one of end credits or a break within a time period that includes the scheduled start time,
where the overflow content comprises a section of the broadcast content that begins at the scheduled start time of the time slot of the broadcast content; and
when the broadcast content does include the overflow content:
determine an end time of the overflow content of the broadcast content;
determine an actual start time of the program content based on the end time of the overflow content; and
perform an action to enable a media client to play back the broadcast content,
where the action enables the media client to begin play back at the actual start time of the program content.

9. The non-transitory computer-readable medium of claim 8, where the one or more instructions, when executed by the one or more processors, cause the one or more processors to:
when the broadcast content does not include the overflow content,
determine the actual start time of the program content to be the scheduled start time of the time slot, or
determine the actual start time of the program content to be before the scheduled start time of the time slot.

10. The non-transitory computer-readable medium of claim 8, where the one or more instructions, that cause the one or more processors to determine whether the broadcast content includes overflow content, cause the one or more processors to:
analyze the section of the broadcast content to detect the end credits; and
determine that the broadcast content includes overflow content when the section includes end credits, or
determine that the broadcast content does not include overflow content when the section does not include end credits.

11. The non-transitory computer-readable medium of claim 8, where the one or more instructions, that cause the one or more processors to determine whether the broadcast content includes overflow content, cause the one or more processors to:
determine that the break occurred during the time period that includes the scheduled start time, where the break is associated with the broadcast content; and
determine that the broadcast content includes overflow content when the scheduled start time occurred during the break, or
determine that the broadcast content does not include overflow content when the scheduled start time did not occur during the break.

12. The non-transitory computer-readable medium of claim 8, where the one or more instructions, that cause the one or more processors to determine the end time of the overflow content, cause the one or more processors to:
determine when the end credits of the overflow content ended,
where the end time of the overflow content corresponds to when the end credits ended; or
determine when supplemental content of the break during the time period that includes the scheduled start time ended,
the supplemental content being included in the overflow content,
where the end time of the overflow content corresponds to when the supplemental content of the break ended.

13. The non-transitory computer-readable medium of claim 8, where the one or more instructions, that cause the one or more processors to perform the action, cause the one or more processors to:
  remove the overflow content from the broadcast content to enable the media client to play back the broadcast content without the overflow content.

14. The non-transitory computer-readable medium of claim 8, where the one or more instructions, that cause the one or more processors to perform the action, cause the one or more processors to:
  provide an indicator that includes information identifying the actual start time of the program content,
    the indicator being included within the broadcast content to enable the media client to begin play back at the actual start time of the program content based on the indicator.

15. A method, comprising:
  identifying, by a device, broadcast content,
    where the broadcast content includes program content of a program;
  identifying, by the device, broadcast content information associated with the broadcast content,
    the broadcast content information including at least one of:
      data identifying a particular broadcast network associated with the broadcast content,
      data identifying a particular broadcast channel associated with the broadcast content, or
      data identifying a program type associated with the broadcast content;
  determining, by the device and based on the broadcast content information, to perform additional analysis of the broadcast content,
    the determination to perform the additional analysis of the broadcast content being based on a measure of frequency with which overflow content occurs in broadcasts associated with the broadcast content information;
  identifying, by the device, a scheduled start time of a time slot associated with the broadcast content;
  determining, by the device and based on the determination to perform additional analysis of the broadcast content, whether the broadcast content includes overflow content based on whether the broadcast content includes at least one of end credits or a break within a time period that includes the scheduled start time,
    where the overflow content comprises a section of the broadcast content that begins at the scheduled start time of the time slot of the broadcast content; and
  when the broadcast content does include the overflow content:
    determining, by the device, an end time of the overflow content of the broadcast content;
    determining, by the device, an actual start time of the program content based on the end time of the overflow content; and
    performing, by the device, an action to enable a media client to play back the broadcast content,
      where the action enables the media client to begin play back at the actual start time of the program content.

16. The method of claim 15, where determining whether the broadcast content includes overflow content comprises:
  analyzing the section of the broadcast content to detect the end credits; and
  determining that the broadcast content includes overflow content when the section includes end credits, or
  determining that the broadcast content does not include overflow content when the section does not include end credits.

17. The method of claim 15, where determining whether the broadcast content includes overflow content comprises:
  determining that the break occurred during the time period that includes the scheduled start time, where the break is associated with the broadcast content; and
  determining that the broadcast content includes overflow content when the scheduled start time occurred during the break, or
  determining that the broadcast content does not include overflow content when the scheduled start time did not occur during the break.

18. The method of claim 15, where determining the end time of the overflow content comprises at least one of:
  determining when the end credits of the overflow content ended,
    where the end time of the overflow content corresponds to when the end credits ended; or
  determining when supplemental content of the break during the time period that includes the scheduled start time ended,
    the supplemental content being included in the overflow content,
    where the end time of the overflow content corresponds to when the supplemental content of the break ended.

19. The method of claim 15, where performing the action comprises:
  removing the overflow content from the broadcast content to enable the media client to play back the broadcast content without the overflow content.

20. The method of claim 15, where performing the action comprises:
  providing an indicator that includes information identifying the actual start time of the program content,
    the indicator being included within the broadcast content to enable the media client to begin play back at the actual start time of the program content based on the indicator.

* * * * *